United States Patent [19]

Kühnel et al.

[11] Patent Number: 4,904,444
[45] Date of Patent: Feb. 27, 1990

[54] METHOD FOR MANIPULATING AND/OR STORING A NUCLEAR REACTOR FUEL ASSEMBLY INCLUDING AN ELONGATED SKELETON WITH FUEL RODS, AND A NUCLEAR REACTOR FUEL ASSEMBLY ESPECIALLY FOR USE WITH THIS METHOD

[75] Inventors: Roland Kühnel, Dietzenbach; Frank Niedner, Oberursel; Ulrich Ristow, Neu-Isenburg; Friedrich Born, Alzenau; Walter Dassbach, Hanau; Manfred Vogt, Limeshain, all of Fed. Rep. of Germany

[73] Assignees: Siemens Aktiengesellschaft, Munich; Reaktor-Brennelement Union GmbH, Hanau, both of Fed. Rep. of Germany

[21] Appl. No.: 781,184

[22] Filed: Sep. 24, 1985

Related U.S. Application Data

[63] Continuation of Ser. No. 358,701, Mar. 16, 1982, abandoned.

[30] Foreign Application Priority Data

Mar. 18, 1981 [DE] Fed. Rep. of Germany ....... 3110582

[51] Int. Cl.$^4$ .............................................. G21C 19/10
[52] U.S. Cl. ...................................... 376/261; 376/262
[58] Field of Search .................... 294/86 A, 86.33, 90, 294/91; 414/146; 250/518.1; 376/260, 261, 262, 264, 268, 271, 277, 287, 463

[56] References Cited

U.S. PATENT DOCUMENTS

| | | | |
|---|---|---|---|
| 1,648,650 | 11/1927 | Lynch | 294/91 |
| 3,377,252 | 4/1968 | Knights . | |
| 3,851,987 | 12/1974 | Jones | 294/86.33 |
| 4,024,406 | 5/1977 | Bevilacqua | 250/518.1 |
| 4,039,842 | 8/1977 | Molton | 250/518.1 |
| 4,173,367 | 11/1979 | Haeussler | 294/90 |
| 4,360,230 | 11/1982 | Wood et al. | 294/86 A |

FOREIGN PATENT DOCUMENTS 5294124 3/1979 Japan .

Primary Examiner—Charles T. Jordan
Assistant Examiner—Richard W. Wendtland
Attorney, Agent, or Firm—Herbert L. Lerner; Laurence A. Greenberg

[57] ABSTRACT

Method for manipulating and/or storing a nuclear reactor fuel assembly including an elongated skeleton structure with fuel rods and a holding device, which includes placing neutron-absorbing material adjacent the fuel rods, fastening a supplemental body with a handle to the skeleton structure, engaging the neutron-absorbing material with the supplemental body, and fitting a coupling part of the holding device to the handle, and a fuel assembly produced according to the method.

8 Claims, 2 Drawing Sheets

METHOD FOR MANIPULATING AND/OR STORING A NUCLEAR REACTOR FUEL ASSEMBLY INCLUDING AN ELONGATED SKELETON WITH FUEL RODS, AND A NUCLEAR REACTOR FUEL ASSEMBLY ESPECIALLY FOR USE WITH THIS METHOD

This application is a continuation of application Ser. No. 358,701, filed Mar. 16, 1982, now abandoned.

The invention relates to a method for manipulating and/or storing a nuclear reactor fuel assembly including an elongated skeleton with fuel rods, which is done by means of a holding device, and a nuclear reactor fuel assembly especially for this method.

Customarily, such nuclear reactor fuel assemblies include a head with a box-like frame or a strap at one end of the skeleton. Unirradiated fuel assemblies are supported as a rule by being suspended by this head part in a holding device serving for storage (such as a trolley guided in a ceiling track), while spent fuel assemblies are as a rule stored while standing vertically in special racks serving as a storage device. Unirradiated as well as irradiated fuel assemblies are generally transported in a transport cask serving as the transporting device. Lifting devices such as traveling cranes or handling machines are provided as special holding devices for manipulating the individual fuel assemblies.

For storing as well as for transporting irradiated as well as unirradiated fuel assemblies, certain regulations regarding the undercriticality of the geometric arrangement formed by the total number of fuel assemblies outside a nuclear reactor, must be observed in order to thereby preclude a nuclear chain reaction.

It is known to ensure the undercriticality of such geometric configurations of fuel assemblies outside a nuclear reactor either by observing certain minimum spacings of the fuel assemblies from each other, or by neutron-absorbing duct tubes for the fuel assemblies.

Limits are set for ensuring the undercriticality by observing certain minimum mutual spacings of the fuel assemblies stored outside a nuclear reactor by taking into consideration the available storage and transport space.

The duct tubes formed of neutron-absorbing material for stored fuel assemblies are as a rule a fixed part of the racks serving as the storage device, in which they form receptacle compartments for the fuel assemblies. The utilization of such a rack is limited by the fact that, for maintaining the undercriticality of the geometric configuration which is formed by the fuel assemblies placed in the rack and thus stored outside a nuclear reactor, these fuel assemblies can contain only a certain maximum enrichment of fissionable material in the nuclear fuel. If fuel assemblies with increased enrichment of fissionable material in the nuclear fuel are to be placed in such a rack, the undercriticality can be maintained only if the content of neutron absorber substances in the material of the duct tubes is increased. However, a considerable technical expenditure is required if the racks available as the storage facility are to be retrofitted accordingly.

It is accordingly an object of the invention to provide a method for manipulating and/or storing a nuclear reactor fuel assembly including an elongated skeleton with fuel rods, and a nuclear reactor fuel assembly especially for use with this method, which overcomes the hereinafore-mentioned disadvantages of the heretofore-known methods and devices of this general type, and to achieve the maintenance of undercriticality of the geometric configuration which is formed by the total number of nuclear reactor fuel assemblies in a transporting and storage facility especially outside a nuclear reactor, without retrofitting this transporting or storage facility and without enlarging the transport or storage space required.

With the foregoing and other objects in view there is provided, in accordance with the invention, a method for manipulating and/or storing a nuclear reactor fuel assembly including an elongated skeleton structure with fuel rods and a holding device, which comprises placing neutron-absorbing material adjacent the fuel rods, fastening a supplemental body with a handle to the skeleton structure, engaging the neutron-absorbing material with the supplemental body, and fitting a coupling part of the holding device to the handle.

In accordance with another mode of the invention, there is provided a method which comprises fastening the supplemental body to an end of the skeleton structure.

In accordance with a further mode of the invention, there is provided a method which comprises placing the neutron-absorbing material which is engaged with the supplemental body in spaces between the fuel rods.

In accordance with an added mode of the invention, there is provided a method which comprises providing the neutron-absorbing material in the form of absorber rods of a nuclear reactor control element.

In accordance with an additional mode of the invention, there is provided a method which comprises fastening at least one additional nuclear reactor fuel assembly including a skeleton with fuel rods to the supplemental body, placing neutron-absorbing material between the fuel assemblies fastened to the supplemental body, and engaging the neutron absorbing material between the fuel assemblies with the supplemental body.

In accordance with the apparatus of the invention, there is provided a nuclear reactor fuel assembly having an elongated skeleton structure with fuel rods, comprising neutron-absorbing material adjacent the fuel rods, a supplemental body being fastened to the skeleton structure and engaging the neutron-absorbing material, a handle disposed on the supplemental body, and a holding device having a coupling part being engageable with said handle.

In accordance with again another feature of the invention, the supplemental body is detachable from the skeleton structure.

In accordance with again an added feature of the invention, the supplemental body is fastened to an end of the skeleton structure. This is done so that the nuclear reactor fuel assembly can be manipulated and/or supported while hanging at this end.

In accordance with again an additional feature of the invention, the supplemental body is bolted or screwed to the skeleton structure. This supplemental body absorbs neutrons from the immediate vicinity of the fuel rods during the manipulation, transportation and storage of the fuel assembly and thereby takes care of maintaining the undercriticality of the geometric configuration of all of the fuel assemblies which are placed in a transporting or storage facility, are located outside a nuclear reactor, and are equipped with such supplemental bodies. Since the supplemental body is disposed at the fuel assembly, existing transport or storage facilities need not be retrofitted if fuel assemblies with increased enrichment of fissionable material in the nuclear fuel are to be inserted. Furthermore, this supplemental body only requires an insignificant enlargement of the transporting or storage space, if at all.

In accordance with yet another feature of the invention, the neutron-obsorbing material adjacent the fuel rods is in the form of rods engaged by the supplemental body.

In accordance with yet a further feature of the invention, the neutron-absorbing material adjacent the fuel rods is in the form of a cross-shaped rod engaged by the supplemental body.

Since the coupling part of the holding device is fitted to the handle at the supplemental body, a fuel assembly cannot be manipulated or stored with the holding device unless it has been provided with a supplemental body. It is thereby ensured that with the holding device a geometric arrangement of a number of fuel assemblies cannot be put together, outside a nuclear reactor, without assuring the undercriticality thereof. In this sense it is advantageous if in accordance with a further mode of the invention, there is provided a method which comprises fastening the supplemental body to the skeleton structure during assembly of the fuel rods to the skeleton structure. Advantageously, it is left with the fuel assembly during all subsequent manipulations, transports and storage and is removed from the fuel assembly before it is inserted into a nuclear reactor or, even better, thereafter.

It is also advantageous if in accordance with an added mode of the invention, there is provided a method which comprises fastening the supplemental body to the skeleton during removal of the fuel assembly from the nuclear reactor. In this case, too, it is of advantage if the supplemental body remains at the fuel assembly during all manipulations, transports and storage of the unloaded irradiated fuel assembly outside the nuclear reactor, so that with this fuel assembly together with other fuel assemblies which are also equipped with a corresponding supplementary body, no geometric configuration can be put together outside a nuclear reactor, having an undercriticality which is not safeguarded.

In accordance with an additional mode of the invention, there is provided a method which comprises providing the supplemental body fastened to the skeleton structure and engaging the neutron-absorbing material in the form of a control element of a nuclear reactor including absorber rods.

In accordance with again another mode of the invention, there is provided a method which comprises placing the fuel assembly in a locking device of a transport and/or storage device cooperating with the supplemental body. The transport and/or storage facility may be a transporting cask or a storage rack. Since the fuel assembly inserted into the transport or storage facility cannot be locked by the operating personnel if the supplemental body is not present at the fuel assembly, an additional possibility for supervision is thus provided to assure that in the transport or storage facility no geometric arrangement of fuel assemblies can be put together outside a nuclear reactor, having an undercriticality which is not ensured.

In accordance with a concomitant mode of the invention, there is provided a method which comprises providing an alarm device cooperating with the transport and/or storage device, and issuing an alarm from the alarm device if the fuel assembly is inserted into the transport and/or storage device and cooperation between the locking device and supplemental body is lacking.

Other features which are considered as characteristic for the invention are set forth in the appended claims.

Although the invention is illustrated and described herein as embodied in a method for manipulating and/or storing a nuclear reactor fuel assembly including an elongated skeleton with fuel rods, and a nuclear reactor fuel assembly especially for use with this method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
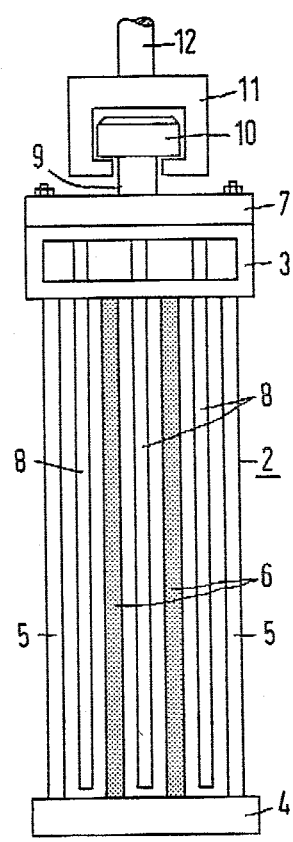
FIG. 1 is a fragmentary, diagrammatic, side-elevational view of a nuclear reactor fuel assembly with a supplemental body and a coupling part of a holding device.

Referring now to the figures of the dfrawing and first particularly to FIG. 1 thereof, it is seen that a fuel assembly 2 has a skeleton which includes a head 3, a bottom part 4 and guide tubes 5 connecting the head 3 and the bottom part 4. Fuel rods 6 which are metal sleeves filled with nuclear fuel furthermore extend from the head 3 to the bottom part 4.

A supplemental body 7 is screwed, i.e., detachably fastened, to the upper end face of the head 3. On its side making contact with the head 3, the supplemental body 7 has rods 8 which extend through the head 3 into the spaces between the fuel rods 6. The supplemental body 7, at least its rods 8 engaged in the spaces between the fuel rods 6, is formed of neutron-absorbing material, such as boron steel. On its upper surface, the supplemental body 7 is provided with a handle which has a shank 9 that is directly fastened to the supplemental body 7 and at the other end thereof the handle has a cylindrical head 10 which overhangs the extent of cross section of the shank 9.

Associated with the handle including the shank 9 and the head 10 is a coupling part 11 which fits the handle and is attached to a non-illustrated holding device, such as a traveling crane or a trolley. This trolley can be disposed in a ceiling track in a storage room for unirradiated fuel assemblies.

Figure 2:
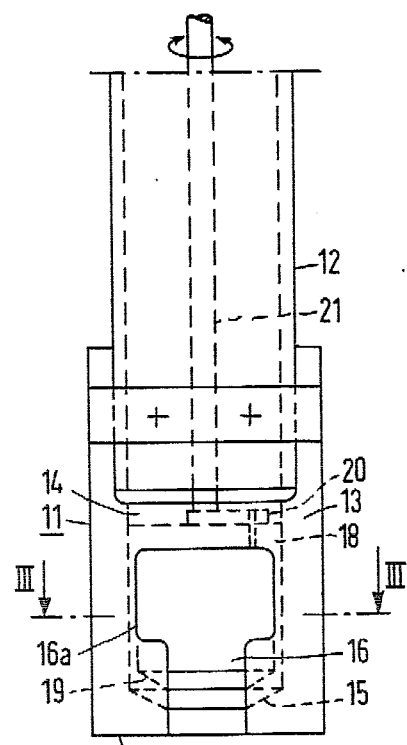
FIG. 2 is a fragmentary, side-elevational view of the coupling part of FIG. 1.
Figure 3:
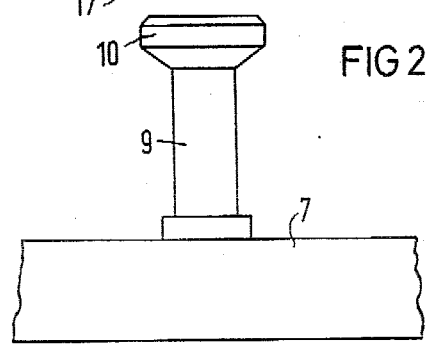
FIGS. 3 and 4 are cross-sectional views of the coupling parts of FIGS. 2 and 5, FIG. 3 being taken along the line III—III in FIG. 2, and FIG. 4 being taken along the line IV—IV in FIG. 5, in the direction of the arrows.
Figure 3:
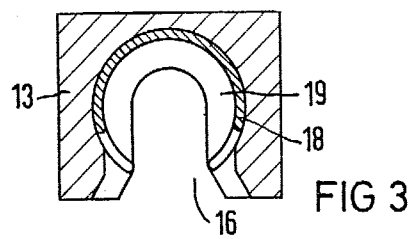
Figure 4:
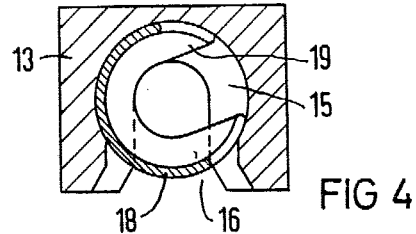

As can be seen in greater detail from FIGS. 2, 3 and 4, the coupling part 11 has a base body 13 hanging on a hollow cylinder 12 with an inner hole 14 which extends from an end thereof with the hollow cylinder 12 to the other end thereof. At this other end, the inner hole 14 has a shoulder 15. At this other end, the base body 13 is also provided with a lateral slot 16 which fits the profile of the handle at the supplemental body 7 for the fuel assembly 2. The shoulder 15 in the hole 14 is located between the end surface 17 of the end of the base body 13 opposite the cylinder 12 and the overhang 16a in the profile of the slot 16 which corresponds to the head 10 of the handle at the supplemental body 7 and which also extends to this end face 17.

A cylindrical sleeve 18 disposed on the shoulder 15 rests in the hole 14 and is disposed coaxially with the hole 14. The cylindrical sleeve 18 likewise has an inside shoulder 19 at an end thereof resting on the shoulder 15, and is laterally provided with a longitudinal slot which starts at the end with the shoulder 19 and also engages this shoulder 19. The width of this longitudinal slot is somewhat larger than the diameter of the head 10 of the handle at the supplemental body 7 for the fuel assembly 2.

At its end opposite the shoulder 19, the sleeve 18 is bolted at its end face to a strap 20 which is rigidly fastened to the end of a rod 21 that is coaxially disposed with respect to the hollow cylinder 12 and with respect to the bore hole 14 in the hollow cylinder 12. With this rod 21, the sleeve 18 can be rotated about the longitudinal axis of the hollow cylinder 12 and the bore hole 14 of the base body 13.

For coupling the supplemental body 7 to the holding device, the handle at the supplemental body 7 is pushed laterally into the bore hole 14 of the base body 13 of the coupling part 11 if the slots of the base body 13 and of the sleeve 18 coincide. The sleeve 18 is then rotated about its longitudinal axis by the rod 21, so that it closes off the longitudinal slot 16 in the base body 13, as is shown in FIG. 4. If the fuel assembly 2 is raised by means of the holding device, the head 10 of the handle at the supplemental body 7 then rests on the shoulder 19 in the sleeve 18 and the sleeve 18 in turn rests on the shoulder 15 of the base body 13 of the coupling part 11.

Manipulation or storage of a fuel assembly 2 with the holding device is possible, because of this coupling part, only if the fuel assembly 2 is equipped with the supplemental body 7, because otherwise, the fuel assembly 2 cannot be coupled by the coupling part 11 of the holding device.

It is therefore advisable to have already screwed the supplemental body 7 to the head 3 of the skeleton of the fuel assembly 2 when the fuel rods 6 are being assembled to the skeleton. The rods 8 of the supplemental body 7, which of course are formed of neutron-absorbing material, can engage in this case into spaces between the fuel rods 6 provided for absorber rods of a nuclear reactor fuel assembly, in case such spaces are provided.

Figure 5:
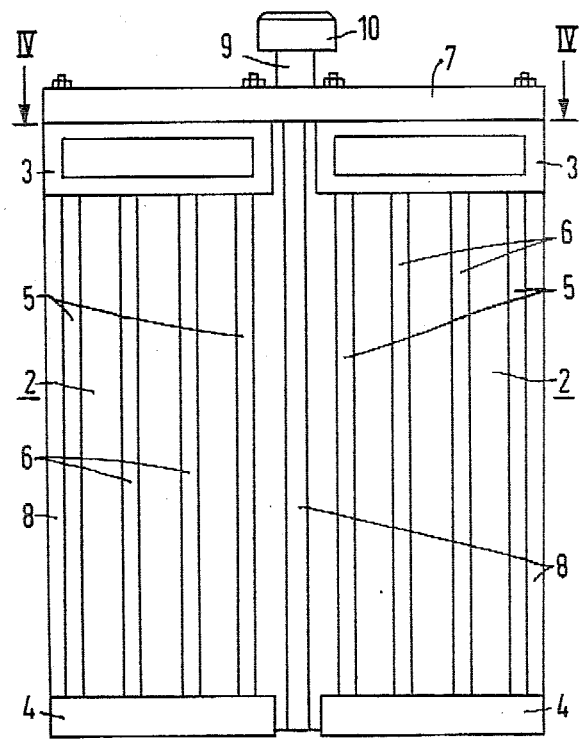
FIG. 5 is a diagrammatic elevational view of a further embodiment of the supplemental body with nuclear reactor fuel assemblies fastened thereto.
Figure 6:
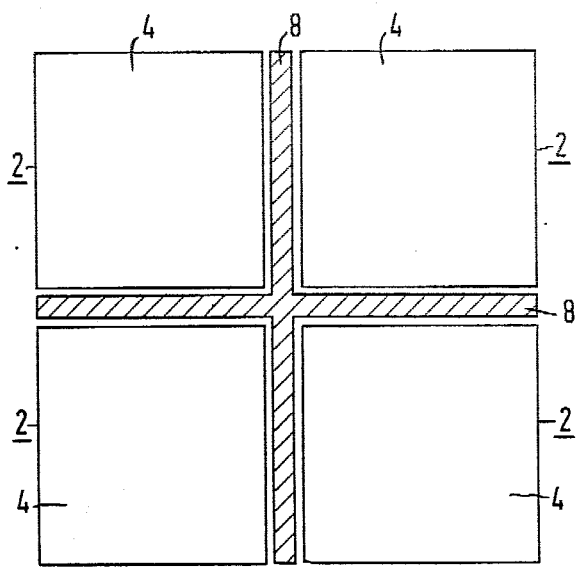
FIG. 6 is a bottom plan view of the supplemental body with the fuel assemblies of FIG. 5.

As is shown in FIGS. 5 and 6, at least one other, and for instance, three other fuel assemblies 2 can be fastened to the supplemental body 7, besides the one fuel assembly 2. In this case, the supplemental body 7 has a rod 8 of neutron-absorbing material, such as boron steel, which has a cross-shaped cross section and engages between the fuel assemblies disposed in the corners of a square. This supplemental body 7 is, for instance, bolted to all four fuel assemblies 2, i.e., detachably connected.

Only fuel assemblies 2 according to FIGS. 1 or 5 equipped with supplemental bodies 7 can be manipulated with a traveling crane as the holding device, which, of course, has a coupling part 11 fitting the handle at the supplemental body 7. Fuel assemblies 2 which have not been provided with such a supplemental body 7, cannot be manipulated before such a supplemental body 7 has been attached to them.

Similarly holding devices, i.e., trolleys in ceiling tracks which are disposed in a fuel assembly storage room for unirradiated fuel assemblies, have coupling parts 11 which fit the handles of the supplemental bodies 7. Therefore, only such fuel assemblies could properly be stored in the fuel assembly storage room suspended from the trolleys as the holding devices, which are equipped with the supplemental bodies 7. Since only nuclear reactor fuel assemblies provided with supplemental bodies 7 can be manipulated with the traveling crane and transferred to the trolleys in the fuel assembly storage room, it is thus ensured that only unirradiated fuel assemblies which are equipped with neutron-absorbing supplemental bodies 7 can be located in the fuel assembly storage room on the trolleys, so that the undercriticality of the geometric configuration of the fuel assemblies in their totality, stored in this fuel assembly storage room outside a nuclear reactor, is preserved even if the mutual spacing between the fuel assemblies is very small. This applies even if a moderator substance, such as steam, enters the fuel assembly storage room.

Operations can advantageously be dispensed with if a control element of a nuclear reactor having absorber rods 8, is fastened to the unirradiated fuel assemblies 2 to be manipulated and/or stored as the supplemental body 7, if possible during the assembly of the fuel assembly or immediately thereafter, and if this is done with absorber rods 8 reaching into the spaces between the fuel rods 6, such as in the guide tubes 5. This allows the detachment of this control element serving as the supplemental body 7 from the fuel assembly and the mounting thereof at corresponding control equipment of the nuclear reactor after the fuel assembly has been inserted into the nuclear reactor. Supplemental bodies 7 not in the form of control elements can also be used, these being detached from the fuel assemblies 2 after the fuel assemblies have been inserted into a nuclear reactor, removed from the nuclear reactor and, if desired, decontaminated, so that they are available for fastening to newly manufactured unirradiated fuel assemblies or even for refastening to fuel assemblies which are spent and must again be unloaded from the nuclear reactor.

In unloading spent fuel assemblies from a nuclear reactor it is also possible to fasten a control element as a supplemental body 7 to the fuel assemblies to be unloaded in such a manner that the absorber rods 8 are engaged next to the fuel rods 6 of the fuel assemblies, such as in the guide tubes 5, and are immovable in this position.

Since spent fuel assemblies can also be manipulated with a traveling crane, which, for instance, has a coupling part 11 fitting the handle at the supplemental body 7 if one of the two hereinafore-mentioned kinds of supplemental bodies 7 is fastened thereto, it is ensured that while manipulating and storing spent fuel assemblies 2 outside a nuclear reactor, the undercriticality of the geometric configuration is also safeguarded, which forms the totality of the stored spent fuel assemblies 2. In this case as well, the spent fuel assemblies can be stored with little spacing therebetween outside a nuclear reactor, without the undercriticality of the geometric arrangement being endangered by a moderator substance that may be added.

Figure 7:
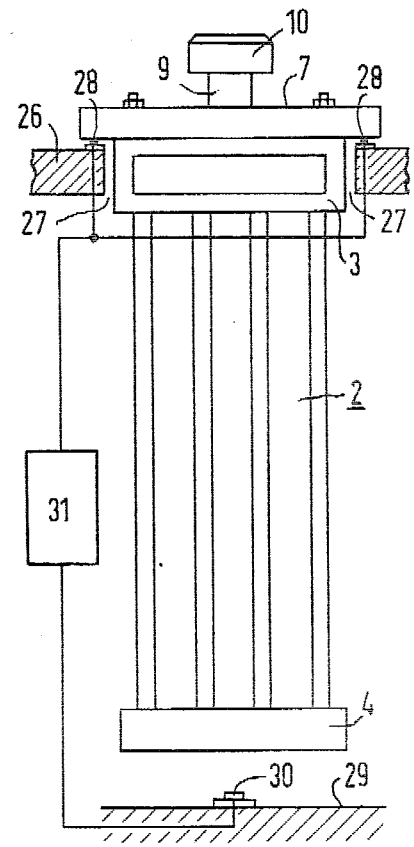
FIG. 7 is a fragmentary side-elevational view of a nuclear reactor fuel assembly which is inserted into a transporting or storage facility and to which a supplemental body is fastened.

An additional safety measure for ensuring that only fuel assemblies 2 provided with a supplemental body 7 are manipulated and/or stored, is diagrammatically illustrated in FIG. 7. In this device, a fuel assembly 2 which is to be inserted into a well 27 formed in a boron steel plate 26 of a storage or transporting device for storage or transport purposes, can be locked by the boron steel plate 26 serving as a locking device, only if at the head 3 of the fuel assembly 2 a supplemental body 7 overhanging this head 3 is attached. The supplemental body 7 rests with its overhanging part on the boron steel plate 26 after the fuel assembly is inserted into the well 27. Two electric contacts 28 which are actuated by the supplemental body 7 and specifically its part overhanging the head 3 of the fuel assembly 2, can be attached to the boron steel plate 26. The actuation takes place if the body 7 rests properly on the boron steel plate 26 and if the fuel assembly 2 is properly inserted in the well 27.

At the bottom 29 of the well 27 there is a further electric contact 30 which is actuated if the fuel assembly 2 has not been provided with a supplemental part 7 overhanging its head 3 and therefore is supported with its bottom part 4 on the bottom 29 after it is inserted into the well 27.

Connected to the contacts 28 and 30 is an electrical alarm device 31 which sounds an alarm if the contact 30 is actuated without the contacts 28 being actuated. The alarm of the alarm device 31 indicates to the operating personnel that a fuel assembly 2 may have been inserted into the well 27 and that cooperation of the boron steel plate 26, acting as the locking device with a supplemental body 7, did not come about, and that the fuel assembly 2 therefore does not have a supplemental body 7. The fuel assembly 2 can therefore be removed immediately from the well 27 and provided with a neutron-absorbing supplemental body 7.

The arrangement according to FIG. 7 may be a storage as well as a transport container for unirradiated as well as for spent fuel assemblies. Since unirradiated and irradiated fuel assemblies are as a rule transported in a horizontal position in an appropriate transport container, it is advantageous to provide a non-illustrated locking device in such a transport container which can only cooperate with a neutron-absorbing supplemental body attached to the fuel assembly, so that the operating personnel cannot lock a fuel assembly inserted into the transport container if this supplemental body 7 is missing.

We claim:

1. Method for manipulating a nuclear reactor fuel assembly without a handle but including an elongated skeleton structure with fuel rods by means of a holding device which does not fit and cannot manipulate the fuel assembly, which comprises fastening a supplemental body with neutron-absorbing material and a handle to the skeleton structure, while placing the neutron-absorbing material adjacent the fuel rods to maintain undercriticality and fitting the handle to a coupling part of the holding device.

2. Method according to claim 1, which comprises fastening the supplemental body to an end of the skeleton structure.

3. Method according to claim 1 or 2, which comprises placing the neutron-absorbing material which is engaged with the supplemental body in spaces between the fuel rods.

4. Method according to claim 3, which comprises providing the neutron-absorbing material in the form of absorber rods of a nuclear reactor control element.

5. Method according to claim 1 or 2, which comprises fastening at least one additional nuclear reactor fuel assembly including a skeleton with fuel rods to the supplemental body, placing the neutron-absorbing material of the supplemental body between the fuel assemblies fastened to the supplemental body, and placing the neutron-absorbing material between the fuel assemblies with the supplemental body.

6. Method according to claim 1 or 2, which comprises fastening the supplemental body to the skeleton structure during assembly of the fuel rods to the skeleton structure.

7. Method according to claim 1 or 2, which comprises fastening the supplemental body to the skeleton during removal of the fuel assembly from the nuclear reactor.

8. Method according to claim 1 or 2, which comprises providing the supplemental body fastened to the skeleton structure and engaging the neutron-absorbing material adjacent the fuel rods in the form of a control element of a nuclear reactor including absorber rods.

* * * * *